Oct. 10, 1967  J. P. VITELLO  3,345,988
CATHETER LUBRICATING SAC
Filed May 27, 1965
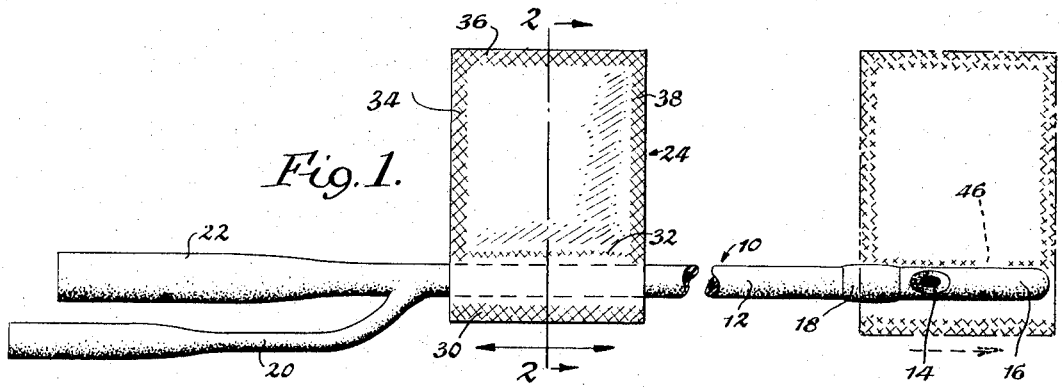
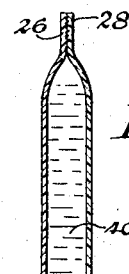
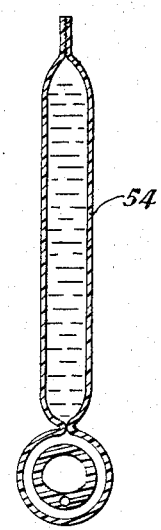
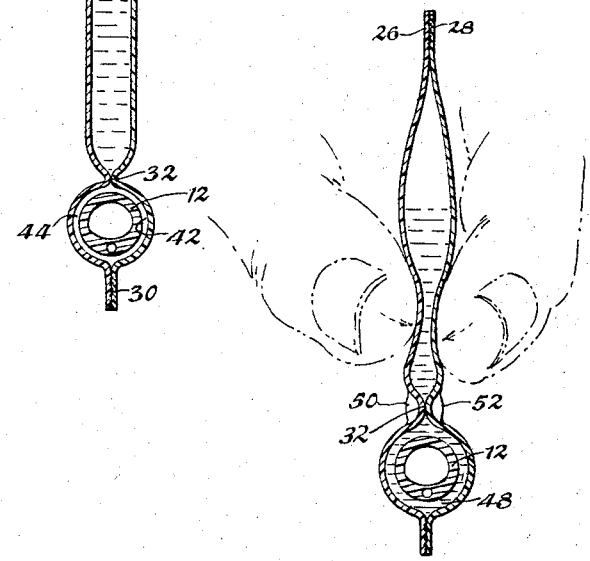
INVENTOR.
JOHN P. VITELLO
BY
Dean, Brooks, Buckley & Dean
ATTORNEYS

3,345,988
CATHETER LUBRICATING SAC
John P. Vitello, Williamsville, N.Y., assignor to Sterilon Corporation, Buffalo, N.Y.
Filed May 27, 1965, Ser. No. 459,158
5 Claims. (Cl. 128—349)

This invention relates to catheter devices and pertains, more particularly, to means for conveniently lubricating a catheter body prior to insertion.

A catheter device having an elongate flexible body adapted to be inserted into the human bladder through the urethra requires a copious lubrication prior to insertion. Inasmuch as the catheter insertion is carried out under sterile conditions, it would be of advantage if the lubricating process could be carried out in a simple and easy fashion and preferably by some mechanism directly attached or related to the catheter device. It is, then, of primary concern in connection with this invention to provide a catheter-lubricator combination wherein a requisite quantity of sterile lubricating material is directly associated with the catheter device and wherein the construction of the lubricator mechanism lends itself readily to distributing the lubricant along the length of the catheter shaft.

Another object of this invention is to provide an improved lubricator device for purposes as aforesaid wherein a flexible sac or bag is provided in combination with a lubricating chamber in which the bag may be manually squeezed to preferentially rupture a portion thereof leading directly into the lubricating chamber. The lubricating chamber is, in turn, of generally tubular configuration so as to slip-fittedly receive the shaft of the catheter device so that as the catheter shaft is slid therethrough, the shaft will be automatically lubricated by the lubricant expelled into the lubricating chamber.

Still another object of this invention is to provide an economical, sterile lubricator assembly for catheters which is in the form of synthetic resin film material provided in two layers and heat sealed or bonded together to provide a lubricant reservoir and a lubricating chamber thereadjacent and wherein the bonding or heat sealing is such as to provide a preferentially rupturable portion between the reservoir and chamber, for purposes as aforesaid.

Other objects and advantages of this invention will appear from the specification hereinafter and the accompanying drawing, wherein:

FIG. 1 is a view illustrating a lubricator according to the present invention associated with a conventional catheter device and showing, in dash-dot lines therein the manner in which the lubricator may be withdrawn from the end of the catheter shaft;

FIG. 2 is an enlarged vertical section taken substantially along the plane of section line 2—2 in FIG. 1 and illustrating details of construction;

FIG. 3 is an enlarged view similar to FIG. 2 but showing the lubricating device in use; and FIG. 4 is a view similar to FIG. 2 but showing a modified form of the invention.

With reference now more particularly to FIG. 1, the reference numeral 10 indicates in general a conventional catheter device which may take any conventional convenient form. The specific catheter shown is of the self-inflating bag catheter type which includes a main drainage shaft portion 12 provided with one or more drainage openings 14 at its distal end 16 and this shaft contains, in addition to the main drainage channel, a duct or lumen extending from the region of the inflatable bag or sleeve 18 through the distention tube portion 20 which branches off from the shaft 12 and the proximal continuation 22 of the drainage channel. The details of the catheter itself form no part of the present invention except insofar as it includes the main shaft portion 12 which is adapted to be inserted through urethra so that the distal end 16 and the opening 14 therein are contained within the human bladder.

The lubricator device according to the present invention is indicated generally by the reference character 24 and will be seen to consist, in the specific embodiment shown in FIGS. 1–3 inclusive, of a pair of superposed sheets 26 and 28 of flexible, film-like material preferably of polyethylene or polyvinyl chloride composition. These sheets are, as shown in FIGS. 1–3, heat-sealed together at one end thereof as indicated by the reference character 30, and in spaced parallel relationship to such line of sealing 30, a further line of sealing 32 is provided substantially as is shown. Further, these sheets are heat-sealed in the regions 34, 36 and 38 in continuous fashion to join with the heat-sealing line 32 and thereby form an isolated reservoir containing a quantity of lubricating material 40 substantially as is shown in FIG. 2. Thus, the lubricator device consists essentially of a bag or sac providing a lubricant reservoir and an extension of said sac or bag as between the two lines of heat sealing 30 and 32 which form a lubricating chamber or channel as will hereinafter more clearly appear, it being noted that the channel or chamber 42 is dimensionally somewhat larger than the shaft 12 to provide a clearance space 44, the purpose of which will be readily apparent. The reservoir for lubricnt is adjacent the chamber or channel 42 and the line of heat sealing 32 as is specifically shown is weak with respect to the lines 34, 36 and 38 of heat sealing so that when the reservoir portion of the bag is squeezed, the line 32 of heat sealing will preferentially rupture or permit the sheets to separate as is indicated at 46 in FIG. 1. Thus, the lubricant 40 may be expressed into the channel 42 to fill the clearance space 44 as indicated at 48 in FIG. 3 wherein the separated portions of the sheets 26 and 28 in the region 46 are indicated by reference characters 50 and 52 respectively. The lubricator is then drawn along the length of the shaft 12 while continuing the expulsion of the lubricant from the reservoir and into the channel 42 in the manner indicated in FIG. 1 so that the entire length of the shaft 12 is copiously lubricated without requiring the user's hands to come in contact with the lubricant. As a modification of the above, the structure according to FIG. 4 may be used wherein a single sheet of material 54 is folded upon itself as shown.

The concept of the present invention is, then, the provision of a flexible bag defining an isolated reservoir and having a preferentially rupturable or separable wall portion for expressing a lubricant into an extension of the bag adjacent such preferentially rupturable portion and forming an open ended chamber for receiving the shaft of a catheter device.

Where only one form of the invention has been illustrated and described in detail hereinabove, it will be understood that various changes may be made therein without departing from the spirit of the invention or the scope of the following claims.

I claim:

1. In combination with a catheter device having an elongate body terminating in a drainage tip,
a lubricating device including a collapsible reservoir containing a quantity of lubricant, and a chamber enclosing and slidably receiving a portion of said body of the catheter, said chamber and said reservoir having a common, rupturable wall portion whereby lubricant may be expressed into said chamber as said reservoir is collapsed.

2. In combination with a catheter device having an elongate drainage body, a lubricating device comprising first and second layers of superposed sheet-like, flexible material enclosing, at one end, said elongated drainage body and projecting laterally therefrom, said layers being sealed together to provide an elongate chamber loosely enclosing a portion of said drainage body in slip-fitted relation thereto, and a lubricant reservoir adjacent said chamber, a quantity of lubricant in said reservoir, and the sealed portion of said layers separating said chamber and said reservoir being rupturable to permit lubricant to be expressed from said reservoir into said chamber.

3. A lubricating device for catheters comprising, in combination, a flexible bag defining an isolated reservoir and having a preferentially rupturable end wall portion, a quantity of lubricant in said reservoir, and an extension on said bag forming an elongate, open ended chamber separated from said reservoir by said preferentially rupturable end wall portion of the bag.

4. The lubricating device as defined in claim 3 wherein said bag and extension thereof are formed of a single sheet of material folded upon itself and heat sealed together to form said reservoir and said chamber.

5. The lubricating device as defined in claim 3 wherein said bag and extension thereof are formed of two sheets of superposed material heat sealed together to form said reservoir and said chamber.

References Cited

UNITED STATES PATENTS

| | | | |
|---|---|---|---|
| 2,863,453 | 12/1958 | Gewecke | 128—227 |
| 2,924,876 | 2/1960 | Lewis | 29—458 |
| 3,053,385 | 9/1962 | Spees | 206—63.2 |
| 3,169,527 | 2/1965 | Sheridan | 128—349 |
| 3,282,414 | 11/1966 | Penska | 206—63.2 |

RICHARD A. GAUDET, *Primary Examiner.*

DALTON TRULUCK, *Examiner.*